United States Patent [19]

Hiei

[11] 4,295,545

[45] Oct. 20, 1981

[54] LUBRICATOR

[75] Inventor: Shoki Hiei, Aichi, Japan

[73] Assignee: Toyooki Kogyo Kabushiki Kaisha, Okazaki, Japan

[21] Appl. No.: 100,242

[22] Filed: Dec. 4, 1979

[30] Foreign Application Priority Data

Dec. 5, 1978 [JP] Japan .................. 53/150723

[51] Int. Cl.³ .............................................. F16N 7/34
[52] U.S. Cl. ................................ 184/55 A; 137/205.5
[58] Field of Search ..................... 184/55 A, 55 R, 58; 137/205.5

[56] References Cited

U.S. PATENT DOCUMENTS

| 3,244,257 | 4/1966 | German et al. | 184/55 A |
| 3,411,609 | 11/1968 | German | 184/55 A |
| 3,605,949 | 9/1971 | Vock | 184/55 A |
| 3,703,940 | 11/1972 | Morita | 184/55 A |

FOREIGN PATENT DOCUMENTS 51-96969  8/1976  Japan .
51-96970  8/1976  Japan .
52-9769   1/1977  Japan .

Primary Examiner—David H. Brown
Attorney, Agent, or Firm—Kenyon & Kenyon

[57] ABSTRACT

A lubricator for a pneumatically operated device comprises a housing provided therein with an air passage for allowing the flow of compressed air between inlet and outlet ports and including a mixture chamber formed at the inlet side thereof with a vertical flat surface wall, an oil dropping chamber provided on the housing for dropping lubricant into the mixture chamber, and a throttle valve member of elastic material having a vertical valve part pressed into contact with the vertical flat surface wall to be flexed in accordance with the flow quantity of the compressed air through the air passage. The vertical valve part of the valve member is provided with an orifice, and a drop tube of elastic material is arranged along the vertical valve part and opens at its upper extremity into the oil dropping chamber and at its lower extremity adjacent to the orifice.

4 Claims, 3 Drawing Figures

LUBRICATOR

BACKGROUND OF THE INVENTION

The present invention relates to a lubricator for such a pneumatically operated device as an air cylinder, a pneumatic control valve and the like, and more particularly to an improvement of a lubricator incorporated in a pneumatic circuit for vaporizing lubricant by compressed air and supplying the vaporized lubricant into sliding portions of the device.

In conventional lubricators of this kind, the compressed air supplied into an inlet port acts, through a bypass passage, on the liquid surface of lubricant in a reservoir casing and simultaneously passes through a throttle valve into a mixing chamber in an air passage before being discharged from an outlet port. This results in increase of the pressure in the reservoir casing and decrease of the pressure in the mixture chamber formed downstream of the throttle valve in the air passage. The lubricant is supplied in the form of drops into the mixture chamber from the reservoir casing due to the difference in pressure between the reservoir casing and the mixture chamber, and the supplied drops of lubricant are vaporized by a jet of the compressed air passing through the throttle valve. If the flow quantity of the compressed air is small this lowers the amount of pressure reduction in the mixture chamber, the supply of lubricant from the reservoir casing will be insufficient to cause delivery of the lubricant as a drop, and in turn, vaporization of the supplied lubricant will be insufficient.

SUMMARY OF THE INVENTION

It is, therefore, a primary object of the present invention to provide an improved lubricator in which lubricant from the reservoir casing is continuously supplied into the mixture chamber irrespectively of changes in the flow quantity of the compressed air, and the vaporized lubricant is mixed as fine mist with the air to lubricate the pneumatically operated device.

Another object of the present invention is to provide an improved lubricator in which a drop of lubricant is directed to a jet of the compressed air passing through the throttle valve without any diffusion.

A further object of the present invention is to provide an improved lubricator wherein, when the inlet port is disconnected from the source of pneumatic pressure, the compressed air existing in the mixture chamber acts to block dropping of the lubricant and flows through the throttle valve toward the inlet port to avoid erroneous operation of the pneumatically operated device caused by the remaining pressure.

According to the present invention there is provided a lubricator for a pneumatically operated device, comprising:

a housing provided at opposite sides thereof with an inlet port for connection to a source of pneumatic pressure and an outlet port for connection to a pneumatically operated device and provided therein with an air passage for allowing the flow of compressed air between the inlet and outlet ports, the air passage including a mixture chamber formed at the inlet side thereof with a vertical flat surface wall;

an oil dropping chamber provided on the housing for dropping lubricant into the mixture chamber; and a throttle valve member of elastic material having a vertical valve part resiliently pressed into contact with the vertical flat surface wall of the mixture chamber to be displaced in accordance with the flow quantity of the compressed air through the air passage; and wherein the vertical valve part of the throttle valve member is provided with an orifice for permitting the compressed air flow therethrough, and a drop tube of elastic material is arranged along the vertical valve part of the throttle valve member and opens at its upper extremity into the interior of the oil dropping chamber and at its lower extremity adjacent to the orifice.

Preferably, the vertical valve part of the throttle valve member is provided with a vertical groove exposed in the mixture chamber and opening at its upper extremity into the interior of the oil dropping chamber and at its intermediate portion into the orifice, and the drop tube is contained within the vertical groove.

It is also preferable that the throttle valve member includes a flat base fixed to the housing within the oil dropping chamber and provided with a drop hole registered with the upper extremity of the vertical groove, the vertical valve part being integrally formed with the flat base, and the drop tube being inserted into the drop hole and supported by the flat base.

BRIEF DESCRIPTION OF THE DRAWING

Additional objects and advantages of the present invention will be more readily apparent from the following detailed description of a preferred embodiment thereof when taken together with the accompanying drawing in which.

DESCRIPTION OF THE PREFERRED EMBODIMENT

Figure 1:
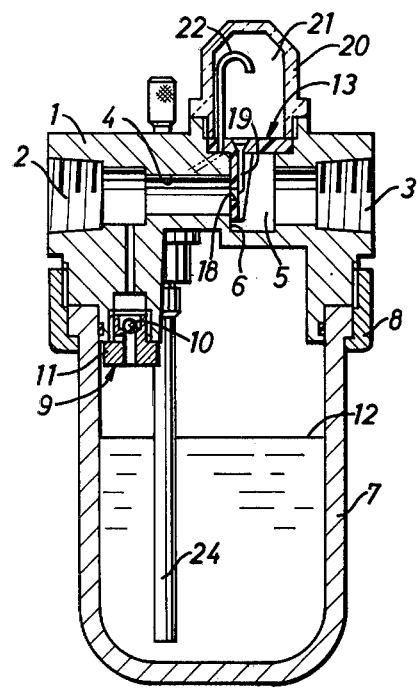
FIG. 1 is a sectional view of a lubricator in accordance with the present invention.
Figure 2:
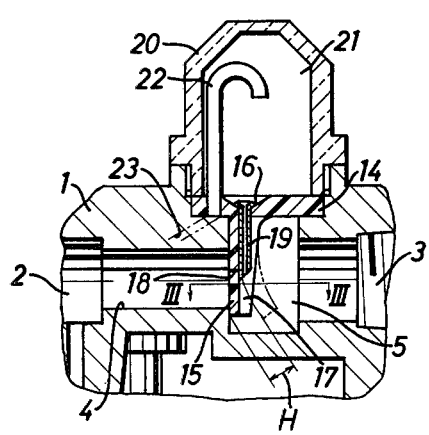
FIG. 2 is an enlarged sectional view showing a throttle valve member and a drop tube of the lubricator.
Figure 3:
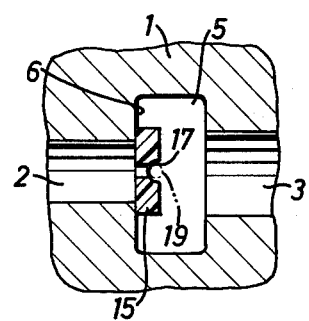
FIG. 3 is an enlarged sectional view taken along a plane of line III—III in FIG. 2.

With reference to FIGS. 1 to 3 of the drawing, a lubricator of the present invention comprises a housing 1 to which a reservoir casing 7 is fixed in a fluid-tight manner by means of a screw ring 8 threaded over the bottom portion of housing 1. The housing 1 is provided at one side thereof with an inlet port 2 for connection to a source of pneumatic pressure and at the other side thereof with an outlet port 3 for connection to such a pneumatically operated device as an air compressor, an air pump, an air cylinder and the like. Coaxially formed between inlet and outlet ports 2 and 3 is an air passage 4 which includes a mixture chamber 5, enlarged in the figure. A stepped portion 6 formed at the inlet side of mixture chamber 5 is provided with a vertical flat surface across the axis of air passage 4. A check valve assembly 9 is fitted to the bottom end of housing 1 to interrupt the flow of air flowing into the interior of reservoir casing 7 from inlet port 2. The check valve assembly 9 includes a screw plug 11 threaded into housing 1 and a ball valve 10 cooperating with a valveseat part of screw plug 11. In this check valve assembly 9, a spiral air passage is formed by the screw threads of plug 11 and housing 1 to permit a small quantity of air to flow into the interior of casing 7 from inlet port 2. This applies the pneumatic pressure from inlet port 2 to the liquid surface of lubricant stored within casing 7.

A throttle valve member 13 is made of such elastic material as synthetic rubber or resin, and includes a flat base 14 fitted within an upper recess of housing 1 and a flat valve part 15 extended vertically downward from the flat base 14. As can be well seen in FIG. 2, the flat base 14 is formed with a drop hole 16, and as can be well seen in FIG. 3, the flat valve part 15 is formed with a vertical groove 17 which opens at its upper extremity into the drop hole 16. The valve part 15 is further provided with a throttle orifice 18 which opens into the vertical groove 17. The valve part 15 of throttle valve member 13 is pressed into contact with the vertical flat surface of stepped portion 6 by its self-resiliency, and it is flexed in accordance with the flow quantity of the air passing through throttle orifice 18 to provide a variable throttle H, as shown by dot-dash lines in FIG. 2.

A flexible drop tube 19 of elastic material is inserted into drop hole 16 and fixed to, and supported by, the flat base 14 of throttle valve member 13. The drop tube 19 is contained within the vertical groove 17 of flat valve part 15 and is arranged to open at its lower extremity above and adjacent to the throttle orifice 18. A dome-shaped lid 20 of transparent material is threaded in a fluid-tight manner into the upper recess of housing 1 to form an oil dropping chamber 21 in open communication with the mixture chamber 5 through drop tube 19. Within the oil dropping chamber 21, an oil supply pipe 22 is fixed at its lower end to the flat base 14 of valve member 13 and communicates with a suction pipe 24 through an oil passage 23. The suction pipe 24 is fixed at its top end to the bottom of housing 1 and submerged into the lubricant stored in reservoir casing 7.

In actual use of the lubricator described above, the compressed air from the souce of pneumatic pressure is supplied into the inlet port 2 and passes to the valve part 15 of throttle valve member 13 through air passage 4. The compressed air is then throttled by orifice 18 and flows into the mixture chamber 5 to be discharged from outlet port 3 into the pneumatically operated device. Simultaneously, a portion of the compressed air flows into the reservoir casing 7 through the spiral air passage 40 to act on the liquid surface of the stored lubricant. This results in decrease of the pressure in mixture chamber 5 and increase of the pressure in casing 7. Owing to the difference in pressure between mixture chamber 5 and casing 7, the stored lubricant is sucked into the oil supply pipe 22 through suction pipe 24 and oil passage 23, and it drops into the oiler chamber 21 to flow into the drop tube 19. Within the mixture chamber 5, the lubricant drop from tube 19 is rapidly vaporized by a jet of the compressed air passing through orifice 18, and the vaporized lubricant is mixed with the air to be supplied into the pneumatically operated device.

In this instance, the vertical valve part 15 of throttle valve member 13 is displaced from the vertical flat surface of stepped portion 6 in accordance with the flow quantity of the air passing through orifice 18 to open the variable throttle H at an appropriate angle, as shown by the dot-dash lines in FIG. 2. This permits the flow of compressed air passing through the variable throttle H and results in effective decrease of the pressure in mixture chamber 5 necessary for continuously vaporizing the lubricant drop in an optimum vaporized state. From the above description, it will be understood that the relative arrangement of throttle orifice 18 and drop tube 19 serves to direct the lubricant drop to a region of the compressed air jet without any diffusion and to effectively produce venturiaction of the compressed air. Consequently, the lubricant is continuously supplied into the mixture chamber 5 irrespectively of changes in the flow quantity of the compressed air, and the vaporized lubricant is mixed as fine mist with the air to lubricate the pneumatically operated device.

When the inlet port 2 is disconnected from the source of pneumatic pressure and exposed to the atmosphere, the valve part 15 of throttle valve member 13 is pressed into contact with the vertical flat surface of stepped portion 6 and is held in place due to a difference in pressure between inlet and outlet ports 2 and 3 to close the variable throttle H. In this instance, the compressed air existing in mixture chamber 5 acts on the lower extremity of drop tube 19 to block dropping of the lubricant, and the compressed air flows through orifice 18 toward the inlet port 2 to avoid erroneous operation of the pneumatically operated device caused by the remaining pressure.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In a lubricator for a pneumatically operated device, comprising:

a housing provided at opposite sides thereof with an inlet port for connection to a source of pneumatic pressure and an outlet port for connection to said pneumatically operated device and provided therein with an air passage for allowing the flow of compressed air between said inlet and outlet ports, said air passage including a mixture chamber formed at the inlet side thereof with a vertical flat surface wall;

an oil dropping chamber provided on said housing for dropping lubricant into said mixture chamber; and a throttle valve member of elastic material having a vertical valve port pressed into contact with the vertical flat surface wall of said mixture chamber to be displaced in accordance with the flow quantity of the compressed air through said air passage;

the improvement wherein the vertical valve part of said throttle valve member is provided with an orifice for permitting the compressed air flow therethrough, and a drop tube of elastic material is arranged along the vertical valve part of said throttle valve member and opens at its upper extremity into the interior of said oil dropping chamber and at its lower extremity adjacent to said orifice.

2. A lubricator as claimed in claim 1, wherein the vertical valve part of said throttle valve member is provided with a vertical groove exposed in said mixture chamber and opening at its upper extremity into the interior of said oil dropping chamber and at its intermediate portion into said orifice, and said drop tube is contained within said vertical groove.

3. A lubricator as claimed in claim 2, wherein said throttle valve member includes a flat base fixed to said housing within said oil dropping chamber and provided with a drop hole registered with the upper extremity of said vertical groove, said vertical valve part being integrally formed with said flat base, and said drop tube being inserted into said drop hole and supported by said flat base.

4. A lubricator as claimed in claim 1, 2 or 3, wherein said throttle valve member and said drop tube are made of elastic synthetic resin.

* * * * *